M. M. MARBEL.
BLOOD CELL CALCULATOR.
APPLICATION FILED JUNE 14, 1919.
1,418,384.
Patented June 6, 1922.
3 SHEETS—SHEET 1.
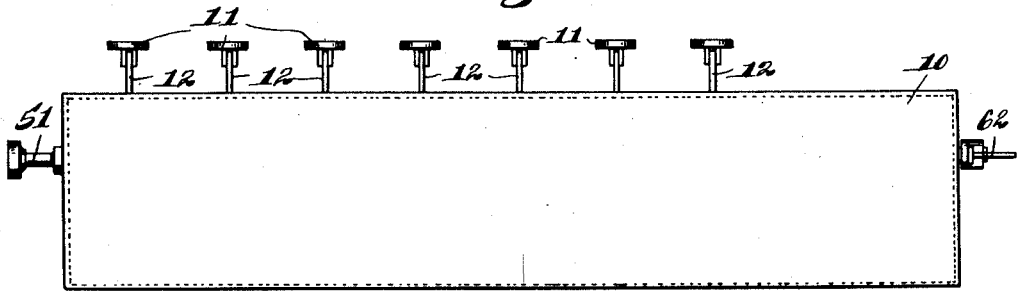
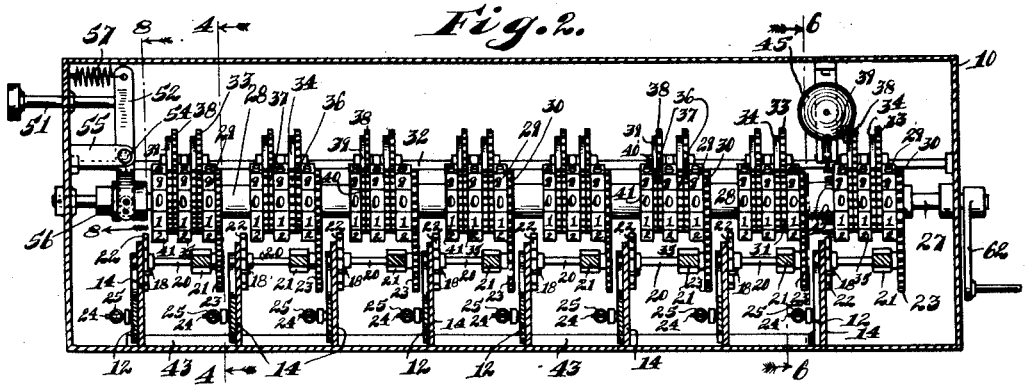
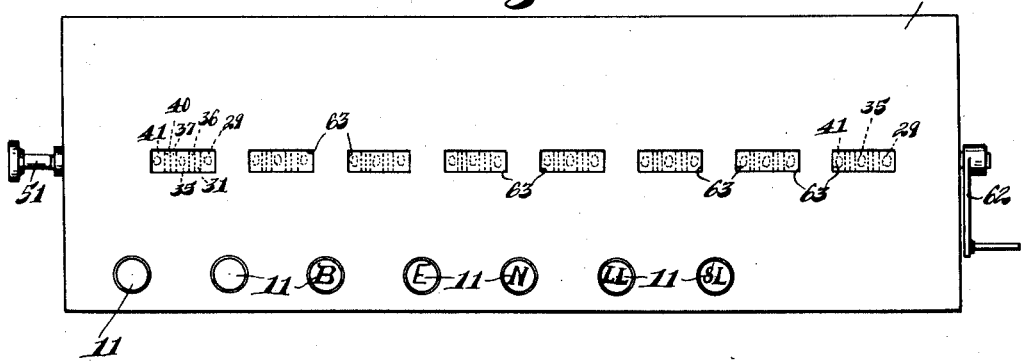
Witnesses:
C. E. Wessels
T. Harefield Donnelly
Inventor:
Myer M. Marbel,
By Joshua R. H. Potts
Attorney.

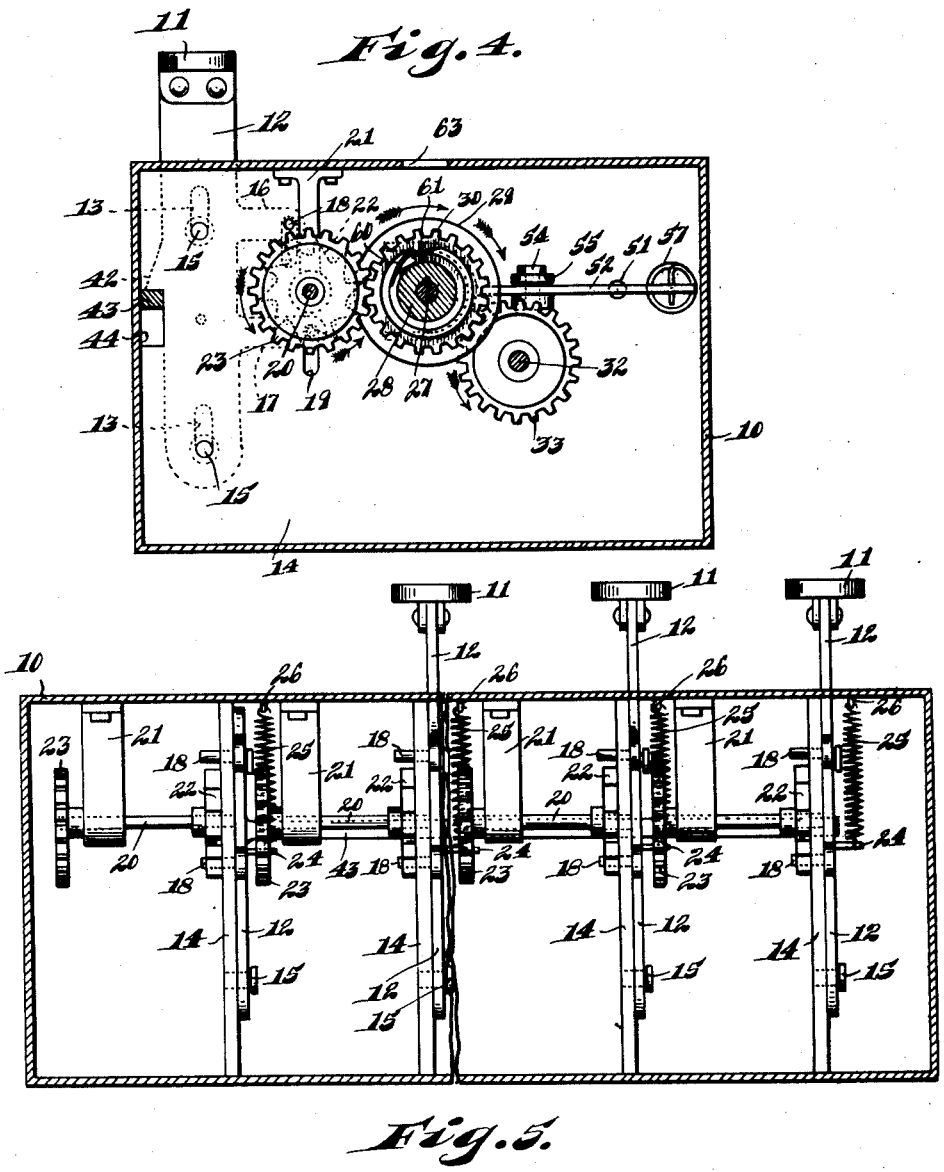

M. M. MARBEL.
BLOOD CELL CALCULATOR.
APPLICATION FILED JUNE 14, 1919.
1,418,384.
Patented June 6, 1922.
3 SHEETS—SHEET 3.
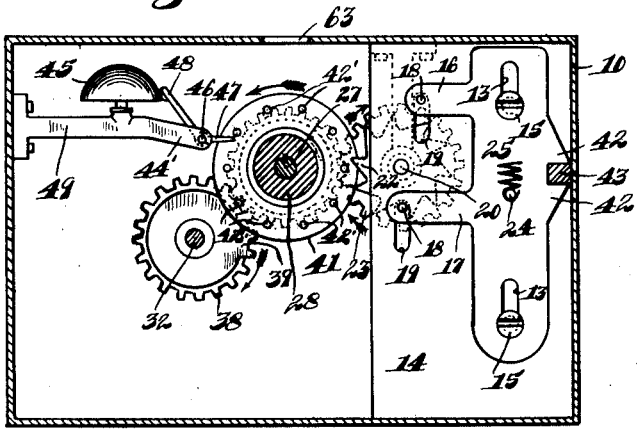
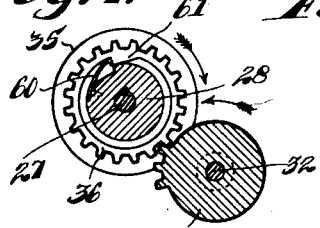
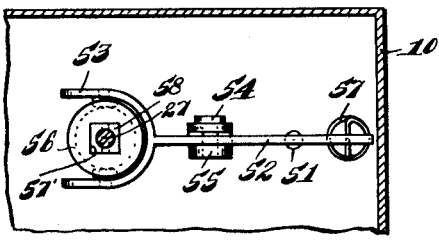
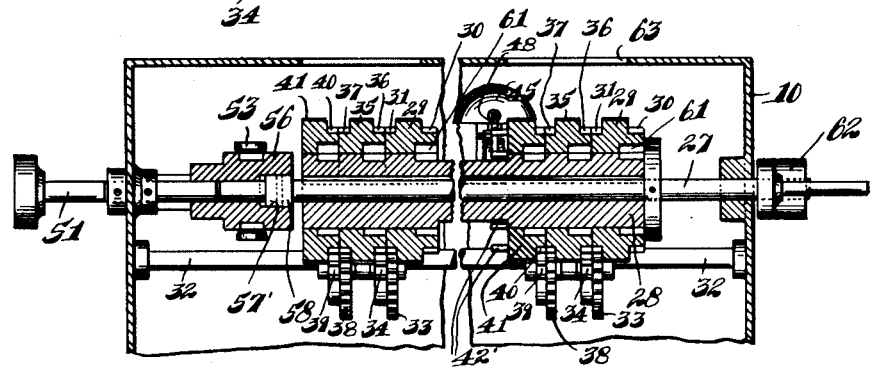

UNITED STATES PATENT OFFICE.

MYER M. MARBEL, OF CHICAGO, ILLINOIS.

BLOOD-CELL CALCULATOR.

1,418,384.  Specification of Letters Patent.  Patented June 6, 1922.

Application filed June 14, 1919. Serial No. 304,334.

*To all whom it may concern:*

Be it known that I, MYER M. MARBEL, a citizen of the United States, and a resident of the city of Chicago, county of Cook, and State of Illinois, have invented certain new and useful Improvements in Blood-Cell Calculators, of which the following is a specification.

My invention relates to a blood cell calculator and has for its object the provision of a device whereby the various blood cells observed under the microscope may be separately registered and added together.

Other objects will appear hereinafter.

The invention consists in the combinations and arrangements of parts hereinafter described and claimed.

The invention will be best understood by reference to the accompanying drawings forming a part of this specification, and in which, Fig. 1 is a front elevational view of my invention, Fig. 2 is a top plan view of the invention with the cover removed, Fig. 3 is a top plan view of the invention, Fig. 4 is a vertical transverse section taken on line 4—4 of Fig. 2, Fig. 5 is an enlarged fragmentary detail view of the tabulating keys and mechanisms, Fig. 6 is a transverse vertical sectional view taken on line 6—6 of Fig. 2, Fig. 7 is an enlarged detail sectional view of one of the discs, Fig. 8 is a sectional view taken on line 8—8 of Fig. 2, and Fig. 9 is a horizontal longitudinal sectional view of the main shaft shown in Fig. 2.

In analyzing blood under the microscope for the purpose of determining the proportionate number of cells in the specimen there observed, it is customary to have a pad upon which the observer is accustomed to note the kinds of cells appearing in the specimen and the number of each respective kind. In order to do this, it is necessary that the operator or observer raise his eyes from the specimen which is being observed through the microscope, with the consequent result that oftentimes the cells appearing under the microscope are confused and counted twice, or not counted at all, and with a consequent loss of considerable time owing to the fact that the observer is required after each time to again find the position in the field of view where he was last counting the cells. In analyzing a specimen of blood under the microscope, there are five species of generic cells which are observed, and of which a record is made in such an analysis. These five varieties or species of cells are used in blood analysis as a basis of computing the proportionate health or disease of the blood analyzed. To obviate the necessity of observers turning away from the field of view in the analyzing process and to render more accurate such an analysis of blood, I have provided a device which is to be used in conjunction with a microscope by the one analyzing the blood. This device, which is stationed on the stand near the microscope, and upon which the observer constantly rests either hand, preferably the left one, consists of a housing 10 positioned above the upper face of which are tabulator keys 11. These keys 11 are seven in number, and five of these keys are lettered with the usual symbols which are used in blood analysis to indicate the five different kinds of blood cells which I have already mentioned. The keys being five in number, it is, therefore, very easy for the observer to retain one finger on each of the keys, and upon observing one of the specified kind of blood cells in the field of view in the specimen which is being analyzed, the corresponding tabulator key 11 is pressed downward, thereby registering by suitable means the presence of that particular kind of blood cell in the specimen. To register the various blood cells in this manner, the key 11 is mounted upon an upright shaft 12, which projects through the upper surface of the housing 10 and extends into the interior thereof. The upright member or shank 12 is provided with two elongated slots 13. Securely mounted in the housing 10 adjacent the point at which the member 12 enters the housing, is a transversely extending partition member 14. And projecting through the elongated slot 13, and securely fastened to the member 14, is a suitable screw or bolt 15, by means of which the member 12 is slidably mounted upon the member 14. Projecting laterally from the member 12 is an arm 16, spaced below which is a similarly laterally projecting arm 17 of slightly greater length than the laterally projecting arm 16, as clearly shown in Fig. 4. Projecting laterally from the outer end of the members 16 and 17 are studs 18 which project through and are adapted to be slidably engaged in elongated slots 19 formed in the member 14.

Mounted in the housing 10, adjacent the opposite side of the member 14, to which the member 12 is mounted, is a shaft 20, said shaft being mounted to the upper wall of the housing 10 by means of a suitable hanger 21. Fixedly mounted to the end of the shaft 20, which is adjacent the member 14, is a ratchet wheel 22, and to the opposite end of the shaft 20 is fixedly mounted a pinion or gear wheel 23. This form of construction is arranged within the housing 10, adjacent each of the partitions 14. Projecting laterally from the member 12, from the side opposite that from which the member 18 projects, is a stud 24, to which is secured the lower end of a spiral spring 25, the upper end of said spring 25 being secured as at 26 to the upper wall of the housing 10. Mounted within the housing 10, and projecting through the lateral walls thereof, is a shaft 27, upon which is loosely mounted a sleeve 28, said sleeve 28 having grooves cut in the periphery thereof, and mounted in said grooves on the member 28 is a disc 29. The periphery of the disc 29 is divided into 10 equal sections and in each section appears a number beginning with one and continuing consecutively around to 9 and which is followed by a 0. Secured to one side of the disc 29 is a gear wheel 30, which is adapted to mesh with the gear wheel 23. Mounted within the housing 10, in close proximity to the shaft 27, is a laterally extending shaft 32, the ends of which are securely fastened to the end walls of the housing 10. Fixedly mounted upon the opposite side of the disc wheel 29 is a gear wheel 31, which is adapted to mesh with the gear wheel 33, which is loosely mounted on the shaft 32. Secured to one side of the gear wheel 33 is a disc 34 having a smooth periphery, except at one point, at which are formed preferably 3 cog teeth, as shown in Fig. 7. Loosely mounted on this sleeve member 28, adjacent the member 31, is a disc wheel 35 similarly constructed, and similarly numbered, to the disc wheel 29. Fixedly secured to the disc wheel 35, on one side thereof, is a gear wheel 36, with which the cogs on the member 34 are adapted to mesh upon rotation of the member 34. Secured to the disc wheel 35, on the opposite side thereof, is the gear wheel 37, which is adapted to mesh with the gear wheel 38, which is loosely mounted upon the shaft 32, the gear wheel 38 being provided on one side thereof with a disc 39 which is constructed in a similar manner to the disc 34. Loosely mounted on the sleeve 28, adjacent the gear wheel 37, is a disc 41 similarly divided into sections and numbered as disc 29. Securely fastened to the disc 41, adjacent one side thereof, is a gear wheel 40, with which the cogs on the member 39 are adapted to mesh on the rotation of the member 38. This construction of the number discs and their adjacent cog wheels, is the same for each of the tabulator keys 11. Consequently, in my invention there are seven such sets of discs and cooperating cog wheels, five of these sets of discs and cooperating cog wheels being positioned adjacent the five tabulator keys which correspond to the five different blood cells which I have mentioned. In operation, the tabulator key 11 being pressed downwardly, the laterally-projecting stud is carried downwardly and engages with one of the teeth on the ratchet wheel 22, thereby causing the ratchet wheel to rotate a slight distance. Upon the downward pressure of the member 11, the laterally projecting member 18, which projects from the member 16, engages the ratchet wheel 22 and at the same time the member 18, which projects from the laterally projecting member 17, is disengaged from the ratchet wheel 22, as shown in Fig. 4. This downward pressure of the member 18 against the ratchet wheel causes the wheel 22 to rotate so as to allow the tooth upon which the member 18 which projects from the laterally projecting member 16 rested, to pass around the point of contact. Upon the downward pressure of the member 11, the spiral spring 25 has a tendency to force the member 12 upwardly into its original starting position. The ratchet wheel is moved a sufficient distance to allow the laterally projecting member 18, which projects from the member 17, to engage the point of a different tooth, thereby completely moving the member 22 the distance of one tooth and securely locking the ratchet wheel 18 in its rotated position. The ratchet wheel 22 being securely fastened to the shaft 20, causes the gear wheel 23 to rotate. This wheel 23 meshing with the gear wheel 30 causes it to rotate a similar distance, and thereby turns the disc 29 so as to present a different relative position of the numbers on the adjacently positioned discs. The gear wheel 31 is also rotated and meshing with the gear wheel 33 causes the gear wheel 33, with its fixedly mounted disc 34, to rotate a similar distance. Upon pressing the tabulator key 11 downwardly ten times, the disc 34 is caused to make one complete revolution, and the cog wheel secured to the disc 34 engages with the cog wheels on the gear wheel 36, causing the gear wheel 36, the disc 35, and the gear wheel 37 to rotate a distance equal to one of the sections into which the disc 35 is divided. Upon complete revolution of the disc 35, the gear wheel 38, with its fixedly mounted disc 39, is caused to make one complete revolution with the consequent result that the cog teeth on the disc 39 causes the disc 41 to rotate a distance equal to one of the sections in which the disc 41 is divided, as will be readily understood.

Each of the members 12 is provided on the edge which is adjacent the lateral wall of the housing 10 with a shoulder 42, said shoulder 42 being adapted to engage against a longitudinally extending bar 43 which is mounted in the housing 10, slots 44 being provided in the partition members 14 to allow for the passage and the vertical movement of said horizontal bar. Mounted within the housing 10, adjacent one side thereof, preferably the side to the right of the tabulator keys is a set of discs and co-operating cog wheels, such as already described. The member 12 which is used in conjunction with this set of discs has no tabulator key 11 and does not project upwardly beyond the top wall of the housing 10, as shown in Fig. 6. This member 12 also has a pair of shoulders 42, one of said shoulders engaging the horizontal bar 43 on its upper surface, the other shoulder engaging the horizontal bar 43 on its under surface so that upon downward pressure of the horizontal bar 43, by any of the tabulator keys, the member 12 which is secured at this side of the housing, is carried downwardly and causes a rotation of the discs with which it co-operates in the manner already described. The shoulder 42 which engages the under surface of the horizontal bar 43 serves to raise the horizontal bar to its original position in response to the tension of the spiral spring 25 which is connected with this member. It is consequently seen that upon a downward pressure of one of the tabulator keys 11, that the disc upon which the numbers appear, that is, the unit disc or the one to the right of the arrangement, is caused to rotate the distance occupied by one of the members. A repetition of the operation will cause the discs to rotate so that the number of times the operation has been gone through will be registered by the numbers that appear on the discs, as will be readily understood. It is also apparent that the set of disc wheels to the right is caused to register each time any one of the tabulator keys 11 is pressed downwardly through the action of the horizontal bar 43 upon the lower shoulder 42 which is secured to this member 12. It is consequently seen that this set of discs will indicate the entire or total number indicated by all of the separate discs taken together, that is, will act as a totaling register. Projecting laterally from one of the faces of the member 41 are studs 42', 10 of said studs being positioned on said member 41 equidistant from each other. Securely mounted in the housing 10 is a bracket 49, the lower end 44' of which is downwardly offset as shown in Fig. 6. Securely mounted upon the member 49 intermediate the ends thereof is a suitable bell 45. Pivotally mounted at 46 to the outer or free end of the member 49 is an arm member which has a metal button secured to one end 48 thereof. The opposite end 47 is angularly offset and so positioned as to be engaged by the members 42' upon the rotation of the member 41. The member 41 rotating in the direction indicated by the arrow causes member 42' to engage the outer end 47, thereby raising the end 48 free and clear from the bell 45. Upon the rotation of the member 41 to such a position that the member 42' disengages with the member 47, that portion 48 of the arm member which is considerably heavier than the portion 47, in response to gravity, moves downwardly and causes the bell 45 to ring. Inasmuch as the member 41 will rotate $\frac{1}{10}$ of a revolution for every 100 numbers which is registered in the device, it is evident that the bell 45 will ring upon the registering of each 100 numbers.

Projecting through one end of the walls of the housing 10 is a bolt 51, the inner end of which is securely fastened to a lever 52 which is bifurcated on its lower end to form the clevis 53, said member 52 being fulcrumed on the pin 54, which projects through the lugs 55, which projects inwardly from the end wall of the housing 10. Slidably mounted in the end wall of the housing 10 is a member 56 which is in alignment with the member 27 and which is provided with a square socket 57' for the reception of the adjacent end 58 of the shaft 27 which is formed with a square head. Secured at one end to the upper end of the member 52 is a spiral spring 57, the opposite end of which is connected to the end wall of the housing. The clevis member 53 is provided with slots which engage trunnions which project laterally from the side of the member 56 and thereby prevent the members 56 from rotating. The construction is such that normally the member 56 engages the member 27 and prevents the same from rotating. Upon inward pressure being exerted upon the member 51, the member 56 is moved out of engagement with the member 27 thereby permitting rotation of the shaft 27.

The discs 29, 35 and 41 are each provided with a shoulder 61 which projects inwardly and engages with a spring member 60, which is rigidly mounted to the sleeve member 28. As shown in Fig. 7, the construction of the member 60 is such as to permit the rotation of the discs about the sleeve 28 in one direction. It is also apparent that upon rotating the sleeve 28 in one direction, the member 60 engages the shoulder 61 and causes the discs to rotate. Secured to one end of the shaft 27, exterior of the housing 10, is a crank member 62 which is adapted to rotate the shaft 27.

After the device has been used and certain of the discs have been rotated upon the member 28 as an axis, before the device can again be used for registering the blood cells of a new specimen, it is necessary to return the discs to their normal position, that is, to that position at which the discs already register 0. To bring this about, the member 56 is disengaged from the member 27 by pressing inwardly on the member 51. The crank 62 is then rotated which carries with it the shaft 27 and the sleeve member 28. The spring member 60 engages against the shoulder 61 and causes the discs to rotate, the shoulder 60 being positioned at the same relative position on each of the discs. The result is that upon reverse rotation of the shaft 27, all of the discs are engaged by the spring member 60 and are rotated simultaneously, the corresponding numbers on each disc being in alignment. Provided upon the upper face of the housing 10 are slots 63 at which the discs bearing the numbers are visible.

By the construction of such a device, the various blood cells which are observed in the field of view under the microscope are rapidly and accurately registered, the total number being registered on the discs which are stationed adjacent the end of the housing. The purpose of the automatically operated bell is to notify the observer when a total of 100 cells have been registered, it being essential in the analyzing process that this number be determined, so that the percentage of the different cells may be computed. The two extra tabulator keys are used to designate the number of blood cells which may be present in the specimen and which are not classified under the five species used as a basis of the analysis, and these tabulator keys are used to register the presence of cells, in the specimen being analyzed, which are termed rare.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a device of the class described, a housing, a shaft mounted in said housing, a series of discs mounted on said shaft, consecutive numbers on the periphery of each disc, a series of longitudinally movable actuating shanks extending into said housing, arms extending from said shanks in one direction and shoulders extending from said shanks in the opposite direction, a series of ratchet wheels individually mounted and operated by the arms on said shanks, there being a shank for each ratchet wheel, a plurality of gear wheels operatively connecting each ratchet wheel with its associated disc, a horizontal bar operated by said shoulders, and a totalizing register mounted on said shaft and actuated by the vertical movement of said bar.

2. In a blood cell counting device, a housing, a shaft mounted in said housing, a series of numbered registering discs mounted upon said shaft, tabulator keys extending above said housing, each key being operatively connected to one of the discs, within the housing, a horizontal operating bar mounted within the housing, means on each key for depressing said bar during actuation of any one of the discs by said keys, a totalizing register within said housing mounted on said shaft, and connecting means between said totalizing register and said bar whereby the totalizing register is operated upon movement of any disc to register the total of said registering discs.

3. In a blood cell counting device, a housing, a shaft mounted in said housing, a series of numbered registering discs mounted upon said shaft, tabulator keys extending above said housing, each key being operatively connected to one of the discs, to actuate said disc independently of the other discs, a horizontal operating bar mounted within the housing parallel with said shaft, means on each key for depressing said bar during actuation of anyone of the discs by said keys, a totalizing register within said housing mounted on said shaft, and a member provided with shoulders engaged by said bar whereby the totalizing register is operated upon movement of any disc to register the total of said registering discs.

In testimony whereof I have signed my name to this specification in the presence of two subscribing witnesses.

MYER M. MARBEL, M. D.

Witnesses:
JOSHUA R. H. POTTS,
THOS. S. DONNELLY.